US011706168B2

(12) United States Patent
Ferrick et al.

(10) Patent No.: US 11,706,168 B2
(45) Date of Patent: Jul. 18, 2023

(54) TRIGGERING EVENT IDENTIFICATION AND APPLICATION DIALOG VALIDATION

(71) Applicant: Salesforce, Inc., San Francisco, CA (US)

(72) Inventors: Allen James Ferrick, San Francisco, CA (US); Edward Ishaq, Alameda, CA (US); Hye Jung Choi, San Mateo, CA (US); Jason Norris, Oakland, CA (US); Kefan Xie, Toronto (CA); Prajna Shetty, San Francisco, CA (US); Pranay Agarwal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/171,367

(22) Filed: Feb. 9, 2021

(65) Prior Publication Data

US 2021/0168102 A1 Jun. 3, 2021

Related U.S. Application Data

(63) Continuation of application No. 15/783,647, filed on Oct. 13, 2017, now Pat. No. 10,951,558.

(Continued)

(51) Int. Cl.
*H04L 51/046* (2022.01)
*H04L 12/18* (2006.01)

(52) U.S. Cl.
CPC ........ *H04L 51/046* (2013.01); *H04L 12/1813* (2013.01)

(58) Field of Classification Search
CPC .... H04L 51/046; H04L 12/1813; G06N 20/00
See application file for complete search history.

(56) References Cited

U.S. PATENT DOCUMENTS 7,853,453 B2 12/2010 Potter
7,873,523 B2 1/2011 Potter et al.
(Continued)

FOREIGN PATENT DOCUMENTS

WO WO-2014141024 A1 * 9/2014 ......... H04L 63/0492
WO WO-2017021579 A1 * 2/2017 ............. G10L 15/18

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

Primary Examiner — Jerry B Dennison
(74) Attorney, Agent, or Firm — Lee & Hayes, P.C.

(57) ABSTRACT

Various embodiments of the disclosure are directed to updating a selected group-based communication interface of a plurality of group-based communication interfaces with an application dialog received from an external application. In an example, user interaction data associated with a group-based communication system can be received from a client device, and a triggering event, associated with an application external to the group-based communication system, can be identified from within the user interaction data. An application dialog request, associated with the triggering event, can be sent to the application and, in response to sending the application dialog request to the application, an application dialog can be received from the application. Based at least partly on a determination that the application is validated for communication with the client device, the application dialog can be output to the client device for display via a group- (Continued)

based communication user interface associated with the group-based communication system.

20 Claims, 10 Drawing Sheets

Related U.S. Application Data

(60) Provisional application No. 62/564,045, filed on Sep. 27, 2017.

(56) References Cited

U.S. PATENT DOCUMENTS

| | | | |
|---|---|---|---|
| 8,015,051 B2 | 9/2011 | Chen et al. | |
| 8,117,287 B2 | 2/2012 | Washburn | |
| 8,171,080 B2 | 5/2012 | Gupta | |
| 8,423,577 B1 | 4/2013 | Lee et al. | |
| 8,676,913 B1 | 3/2014 | Roche et al. | |
| 8,750,836 B2 | 6/2014 | Woloshyn | |
| 8,996,639 B1 | 3/2015 | Faaborg et al. | |
| 9,713,774 B2 | 7/2017 | Hoomani et al. | |
| 9,922,124 B2 | 3/2018 | Rathod | |
| 9,948,583 B2 | 4/2018 | Smullen et al. | |
| 10,303,762 B2 | 5/2019 | Markman et al. | |
| 10,326,748 B1 | 6/2019 | Brisebois et al. | |
| 10,348,655 B1 | 7/2019 | Suhail et al. | |
| 10,404,636 B2 | 9/2019 | Rodriguez et al. | |
| 10,417,613 B1 | 9/2019 | Brisebois et al. | |
| 10,425,783 B1 | 9/2019 | Caldwell et al. | |
| 10,547,574 B2 | 1/2020 | Pham | |
| 10,554,589 B1 | 2/2020 | Ledet | |
| 10,581,764 B1 | 3/2020 | Ledet | |
| 10,581,788 B2 | 3/2020 | Morrison et al. | |
| 10,585,562 B2 | 3/2020 | Gurtin et al. | |
| 10,587,708 B2 | 3/2020 | Laird-McConnell et al. | |
| 10,659,403 B2 | 5/2020 | Smullen et al. | |
| 10,951,558 B2* | 3/2021 | Ferrick | H04L 12/1813 |
| 11,038,906 B1* | 6/2021 | Bingham | H04L 43/065 |
| 2003/0065776 A1 | 4/2003 | Malik et al. | |
| 2003/0097406 A1 | 5/2003 | Stafford | |
| 2004/0111479 A1 | 6/2004 | Borden et al. | |
| 2005/0076338 A1 | 4/2005 | Malik | |
| 2006/0095556 A1 | 5/2006 | Arnold et al. | |
| 2008/0168095 A1 | 7/2008 | Larcombe et al. | |
| 2008/0195571 A1 | 8/2008 | Furuuchi et al. | |
| 2009/0049513 A1 | 2/2009 | Root et al. | |
| 2010/0099444 A1 | 4/2010 | Coulter et al. | |
| 2010/0235235 A1 | 9/2010 | Hosseini et al. | |
| 2011/0092221 A1 | 4/2011 | Zubas et al. | |
| 2012/0016678 A1 | 1/2012 | Gruber et al. | |
| 2012/0054645 A1 | 3/2012 | Hoomani et al. | |
| 2012/0191445 A1 | 7/2012 | Markman et al. | |
| 2012/0254361 A1* | 10/2012 | Malkhasyan | G06F 21/57 709/218 |
| 2012/0271831 A1 | 10/2012 | Narayanan et al. | |
| 2012/0323565 A1 | 12/2012 | Hildreth et al. | |
| 2013/0046791 A1 | 2/2013 | Markman et al. | |
| 2013/0047099 A1 | 2/2013 | Markman et al. | |
| 2013/0179521 A1 | 7/2013 | Hu | |
| 2013/0346885 A1 | 12/2013 | Singh et al. | |
| 2014/0114895 A1 | 4/2014 | Beechum et al. | |
| 2014/0163954 A1 | 6/2014 | Joshi et al. | |
| 2014/0314225 A1 | 10/2014 | Riahi et al. | |
| 2015/0032724 A1 | 1/2015 | Thirugnanasundaram et al. | |
| 2015/0066479 A1 | 3/2015 | Pasupalak et al. | |
| 2015/0207765 A1 | 7/2015 | Brantingham et al. | |
| 2015/0242389 A1 | 8/2015 | Morrissey | |
| 2015/0302301 A1 | 10/2015 | Petersen | |
| 2016/0308794 A1 | 10/2016 | Kim et al. | |
| 2017/0149703 A1 | 5/2017 | Willett et al. | |
| 2017/0171117 A1 | 6/2017 | Carr et al. | |
| 2017/0171121 A1 | 6/2017 | Zhang et al. | |
| 2017/0180276 A1 | 6/2017 | Gershony et al. | |
| 2017/0180294 A1 | 6/2017 | Milligan et al. | |
| 2017/0279906 A1* | 9/2017 | Laird-McConnell | H04L 51/02 |
| 2017/0293834 A1 | 10/2017 | Raison et al. | |
| 2018/0075014 A1* | 3/2018 | Duan | G06N 5/022 |
| 2018/0082210 A1* | 3/2018 | McCord | G06N 20/00 |
| 2018/0083898 A1 | 3/2018 | Pham | |
| 2018/0183810 A1 | 6/2018 | Jones et al. | |
| 2018/0240015 A1 | 8/2018 | Martin et al. | |
| 2018/0247549 A1 | 8/2018 | Martin et al. | |
| 2018/0287982 A1 | 10/2018 | Draeger et al. | |
| 2018/0332167 A1* | 11/2018 | Lu | G06F 16/3322 |
| 2018/0367483 A1 | 12/2018 | Rodriguez et al. | |
| 2018/0367484 A1* | 12/2018 | Rodriguez | H04L 67/75 |
| 2019/0052701 A1 | 2/2019 | Rathod | |
| 2019/0096425 A1* | 3/2019 | Akkiraju | G06F 16/24578 |
| 2019/0180750 A1 | 6/2019 | Renard et al. | |
| 2019/0182227 A1 | 6/2019 | Rutherford-Jenkins et al. | |
| 2019/0222544 A1* | 7/2019 | Ferrick | H04L 51/046 |
| 2019/0324780 A1 | 10/2019 | Zhu et al. | |
| 2019/0394147 A1 | 12/2019 | Rodriguez et al. | |
| 2020/0036783 A1 | 1/2020 | Bourassa et al. | |
| 2020/0051019 A1 | 2/2020 | Kamani et al. | |
| 2020/0081939 A1* | 3/2020 | Subramaniam | G06N 5/022 |
| 2020/0097247 A1 | 3/2020 | Molina et al. | |
| 2020/0106726 A1 | 4/2020 | Pham | |
| 2020/0304523 A1* | 9/2020 | Yadav | H04L 63/0227 |
| 2021/0168102 A1* | 6/2021 | Ferrick | H04L 12/1813 |

OTHER PUBLICATIONS

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 15/783,647, dated Jul. 7, 2020, Ferrick, "Triggering Event Dentification and Application Dialog Validation ", 17 Pages.

Dikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

(56) References Cited

OTHER PUBLICATIONS

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

\* cited by examiner

TRIGGERING EVENT IDENTIFICATION AND APPLICATION DIALOG VALIDATION

The present application claims priority to and is a continuation of U.S. patent application Ser. No. 15/783,647, titled "TRIGGERING EVENT IDENTIFICATION AND APPLICATION DIALOG VALIDATION," filed on Oct. 13, 2017, which claims priority to U.S. Provisional Application Ser. No. 62/564,045, titled "TRIGGERING EVENT IDENTIFICATION AND APPLICATION DIALOG VALIDATION," filed Sep. 27, 2017, the contents of which are incorporated herein by reference in their entirety.

BACKGROUND

A communication system may support communication and collaboration among users. Applicant has identified a number of deficiencies and problems associated with communications in a communication system. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein include method, apparatus, and computer program products for validating an application dialog received from an external application following a triggering event identified in association with a group-based communication interface.

In some embodiments of the present disclosure, an apparatus may be provided for identifying a triggering event associated with a group-based communication interface, the apparatus comprising at least a processor, and a memory associated with the processor having computer coded instructions therein, with the computer instructions configured to, when executed by the processor, cause the apparatus to receive user interaction data associated with the group-based communication interface from a client device; parsing the user interaction data to identify a triggering event, wherein the triggering event is associated with an external application; in circumstances where the triggering event is identified among the user interaction data, transmitting a trigger token to the external application associated with the triggering event, receiving an application dialog and dialog validation data from the external application, determining if the dialog validation data satisfies external application validation parameters; and in circumstances where the dialog validation data satisfies the external validation parameters, outputting the application dialog to the client device for display by the group-based communication interface.

In some embodiments, the dialog validation data comprises time stamp data. In some embodiments, the dialog validation data comprises the trigger token and time stamp data. In another example embodiment, the external application validation parameters comprise a pre-determined time period. Further, in some embodiments, determining if the dialog validation data satisfies the external application validation parameters comprises comparing the pre-determined time period to a difference between the time stamp data and a system time.

In some embodiments, the dialog validation data comprises the application dialog itself, and the external application validation parameters comprise a historical communication indicator between an external application and a validation server. Further, the historical communication indicator comprises frequency of application dialogs being sent and historical application dialog content indicator.

In some embodiments, the historical application dialog content indicator indicates whether historical application dialog content is inappropriate content or contains validating topics. Further, the historical application dialog content indicator is obtained by executing the following computer instructions: receiving an application dialog; parsing an application dialog to determine whether the application dialog contains inappropriate content or validating topics; updating the historical application dialog content indicator based on whether the application dialog contains inappropriate content or validating topics.

In some embodiments, identifying a triggering event comprises identifying a slash command. In another example embodiment, identifying a triggering event comprises analyzing user profile of the user associated with the user interaction data.

Another embodiment of the present disclosure is an apparatus for identifying a triggering event associated with a group-based communication interface, the apparatus comprising at least a processor, and a memory associated with the processor having computer coded instructions therein, with the computer instructions configured to, when executed by the processor, cause the apparatus to: receive user interaction data associated with the group-based communication interface from client devices; and compare the user interaction data to a triggering event registry to identify a triggering event; in circumstances where the triggering event is identified among the user interaction data based on the comparison to the triggering event registry, identify an external application address associated with the triggering event; and transmit a trigger token to the external application address.

In some embodiments, comparing the user interaction data to a triggering event registry to identify a triggering event comprises: determining topics associated with the group-based message associated with the user interaction; and comparing the user interaction data received with user interaction data associated with similar topics stored on the triggering event registry. Further, in some embodiments, the triggering event registry is updated programmatically using machine learning techniques, the updating process comprises accessing user interaction data related data from a database; parsing, using a user interaction data analysis and normalization module, the user interaction data to generate one or more identification data units; extracting one or more features from the one or more identification data units, wherein the features are representative of at least one of user interaction data, user profile associated with the user interaction, topics associated with the user interaction data, and frequency of user interaction; receiving a triggering event identification model, wherein the triggering event identification model was derived using a historical triggering event identification data set; and generating an output based on the triggering event identification model and the one or more features, wherein the output is configured to update the triggering event registry.

In some embodiments, comparing the user interaction data to a triggering event registry to identify a triggering event comprises identifying the user associated with the user interaction data and comparing the user interaction data received with the user interaction data for users with similar user. Further, in some embodiments, the user interaction data to be compared to a triggering event registry comprises user interaction data of multiple users.

In another example embodiment, a method may be provided for validating an application dialog received from an external application following a triggering event identified in association with a group-based communication interface. The method may further include receiving user interaction data associated with the group-based communication interface from a client device; parsing the user interaction data to identify a triggering event, wherein the triggering event is associated with an external application; in circumstances where the triggering event is identified among the user interaction data, transmitting a trigger token to the external application associated with the triggering event, receiving an application dialog and dialog validation data from the external application, determining if the dialog validation data satisfies external application validation parameters; and in circumstances where the dialog validation data satisfies the external validation parameters, outputting the application dialog to the client device for display by the group-based communication interface.

In some embodiments, the dialog validation data comprises time stamp data. Further, in some embodiments, the dialog validation data comprises the trigger token and time stamp data. In some embodiments, the dialog validation data comprises the application dialog itself, wherein the external application validation parameters comprise a pre-determined time period, and wherein determining if the dialog validation data satisfies the external application validation parameters comprises comparing the pre-determined time period to a difference between the time stamp data and a system time. In some embodiments, the historical application dialog content indicator indicates whether historical application dialog content is inappropriate content or contains validating topics.

In another example embodiment, the historical application dialog content indicator is obtained by executing the following computer instructions: receiving an application dialog; parsing an application dialog to determine whether the application dialog contains inappropriate content or validating topics; updating the historical application dialog content indicator based on whether the application dialog contains inappropriate content or validating topics.

In some embodiments, identifying a triggering event comprises identifying a slash command. In some embodiments, identifying a triggering event comprises analyzing user profile of the user associated with the user interaction data.

Another embodiment of the present disclosure is a method for identifying a triggering event associated with a group-based communication interface, the method comprising: receiving user interaction data associated with the group-based communication interface from client devices; and comparing the user interaction data to a triggering event registry to identify a triggering event; in circumstances where the triggering event is identified among the user interaction data based on the comparison to the triggering event registry; identifying an external application address associated with the triggering event, and transmitting a trigger token to the external application address.

In some embodiments, comparing the user interaction data to a triggering event registry to identify a triggering event comprises: determining topics associated with the group-based message associated with the user interaction; comparing the user interaction data received with user interaction data associated with similar topics stored on the triggering event registry.

In some embodiments, the triggering event registry is updated programmatically using machine learning techniques, the updating process comprises: accessing user interaction data related data from a database; parsing, using an user interaction data analysis and normalization module, the user interaction related data to generate one or more identification data units; extracting one or more features from the one or more identification data units, wherein the features are representative of at least one of user interaction data, user profile associated with the user interaction, topics associated with the user interaction data, and frequency of user interaction; receiving a triggering event identification model, wherein the triggering event identification model was derived using a historical triggering event identification data set; and generating an output based on the triggering event identification model and the one or more features, wherein the output is configured to update the triggering event registry.

In some embodiments, comparing the user interaction data to a triggering event registry to identify a triggering event comprises identifying the user associated with the user interaction data and comparing the user interaction data received with the user interaction data for users with similar user profiles stored on the triggering event registry.

In some embodiments, the user interaction data to be compared to a triggering event registry comprises user interaction data of multiple users. In some embodiments, the user interaction data to be compared to a triggering event registry comprises user interaction data of multiple users.

BRIEF DESCRIPTION

Reference will now be made to the accompanying drawings, which are not necessarily drawn to scale, and wherein.

DETAILED DESCRIPTION

Figure 1:
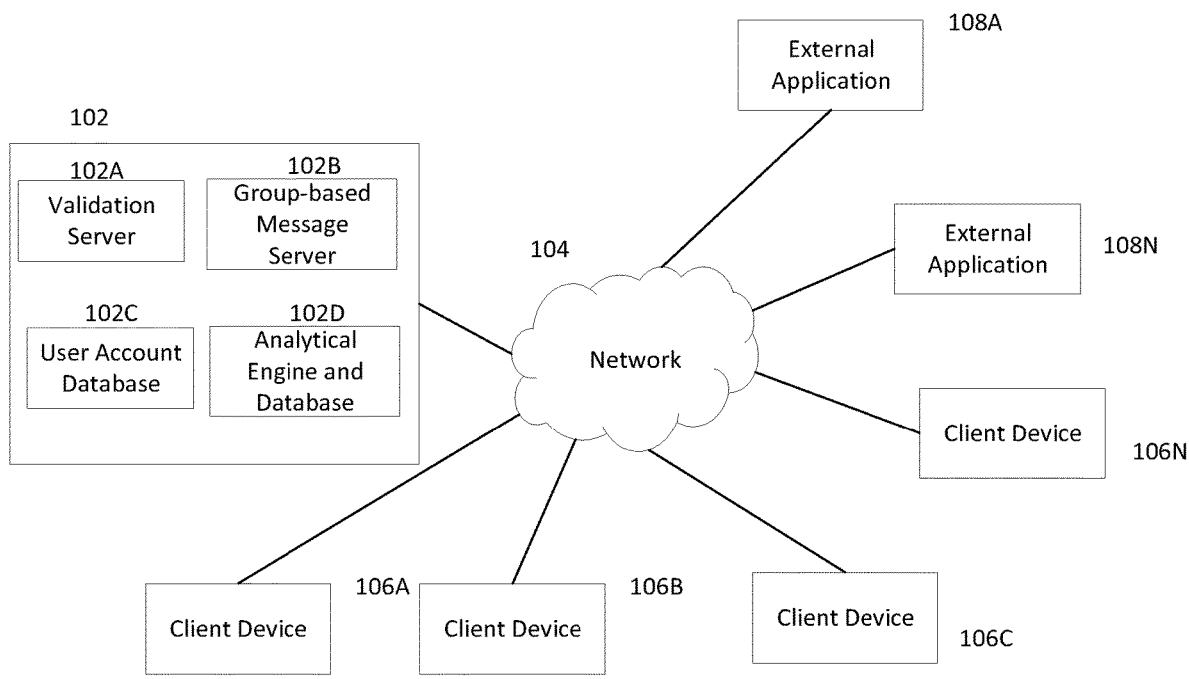
FIG. 1 illustrates an example trigger identification application dialog validation (TI-ADV) system structured in accordance with some embodiments discussed herein.

Some embodiments of the present disclosure will now be described more fully hereinafter with reference to the accompanying drawings, in which some, but not all embodiments of the disclosures are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and the like; the users referred to herein are accessing a group-based communication system (defined below) using client devices.

The term "client device" refers to a network connected machine having computer hardware and/or software that is configured to access a service made available within a group-based communication system. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of a topic or key words associated with the topic within such messages).

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and external applications. The supporting servers comprise, among other components, a group-based message server, a validation server, a user account database, an analytical engine, and the like.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display group-based messages posted by channel members (e.g., validated users accessing the environment using client devices) that are viewable only to channel members. The format of the group-based communication channel may appear differently to different users of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel (i.e., group-based messages) will not vary per member of the group-based communication channel.

The terms "group-based message" and "message" refer to any electronically generated digital content object provided by a user using a client device that is configured for display within a group-based communication channel. Message communications may include any text, image, video file, audio file, streaming content, or combination thereof provided by a user (using a client device). For instance, the user may provide a group-based message that includes text as well as an image and a video file within the group-based message as message contents. In such a case, the text, image, and video file would comprise the group-based message or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "user interaction data" refers to data generated based on user interaction with one or more of the client devices. For example, user interaction data may be generated based on group-based message, inputs, uploads, or other user engagement of a group-based communication interface.

The terms "user profile," "user account," and "user account details" refer to information associated with a user, including, for example, a user identifier, one or more group-based communication channel identifiers associated with group-based communication channels that the user has been granted access to, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password. For example, and without limitation, a user identifier may include a unique graphical identifier (e.g., an avatar), an IP address, a MAC address, and the like.

The term "external application" refers to a software program, platform, or service that is configured to communicate with the group-based communication system but requires validation, by the group-based communication system, to communicate with a client device via a group-based communication interface. For example, an external application may communicate with an application program interface through a validation server of a group-based communication system. Once validated by the validation server, the external application may transmit an application dialog through the group-based communication system to a targeted client device. For example, an external application may communicate with a validation server via an OAuth protocol.

The term "application dialog" refers to data and/or instructions that are transmitted by an external application through a validation server and ultimately to a client device for rendering a group-based message for display via the client device to a user via a group-based communication interface. For example, an application dialog may comprise data and instructions for rendering a form or template as a modal or other graphic user interface component that is intended to solicit feedback from a user accessing the group-based communication interface.

The term "triggering event" refers to an action, incident, collection of steps, or processes executed by a user within a group-based communication interface that is identifiable by a validation server and may be correlated to one or more application dialog requests. Triggering events may be pre-defined (e.g., button clicks, slash commands, etc.) or may be learned by the group-based communication system over time using machine learning models or other similar techniques. In example embodiments, once a triggering event is identified, the validation server is configured to transmit a trigger token to an external application associated with the triggering event and/or any respectively correlated application dialog request.

The term "triggering event registry" refers to a stored collection or database of triggering events and associated triggering event requests that is accessible by the validation server of the group-based communication system to identify triggering events, route triggering token communications, and to validate external application communications including application dialogs. The triggering event registry may be updated manually with pre-defined triggering events and associated information or programmatically using machine learning techniques. One example triggering event registry comprises user interaction data, external application information such as external application ID, external application address, application dialog requests indicators, and the like. In some embodiments, application dialog request indicators comprise information indicating application dialogs associated with a triggering event.

The term "trigger token" refers to a code or data set that is used by a validation server following a triggering event to validate or authenticate an external application or an application dialog. The trigger token may be a pseudorandom generated number, key, or other unique identifier.

The term "dialog validation data" refers to any data set, data package, or other communication that is sent from an external application and may be used by a validation server of the group-based communication system to validate an application dialog. For example, dialog validation data may comprise time stamp data, a trigger token, external application identification information, and the like.

The term "external application validation parameters" refers to a set of routines, characteristics, functions, values, rules, or algorithms that the validation server may use to determine whether an application dialog should be validated. For example, external application validation parameters may comprise a response time threshold (i.e., a time period deemed acceptable between a trigger token transmission time stamp and a dialog validation data received time stamp). In another example, external application validation parameters may comprise a communications history collected between an external application and a validation server, such as the frequency of application dialogs being sent, validation rate of previous application dialogs, validation failure reason indicator, and application dialog content indicator.

The term "external application address" refers to a location or network address where an external application is configured to receive data and/or instructions or otherwise receive communications from other network entities (e.g., a validation server, client device, etc.). For example, an external application address may comprise address space used by an application programming interface (API) call, inter-process communication (IPC) address space, remote procedure call (RPC) address space, and the like. In another example, an external application address may comprise an Internet Protocol (IP) address associated with the external application, media access control (MAC) address associated with a hardware device associated with the external application, and the like.

Overview

Various embodiments of the disclosure are directed to updating a selected group-based communication interface (e.g., an interface for ACME Corp.) from a plurality of group-based communication interfaces (e.g., an interface for other organizations/companies) with an application dialog received from an external application. The group-based communication interface includes a plurality of group-based communication channels (e.g., a marketing channel, sales channel, accounting channel, etc.). The selected group-based communication interface is accessible and viewable to a select group of users, such as a group of employees of a business or organization (e.g., the ACME Corp. interface would be accessible and viewable to the ACME team). The selected group-based communication interface is updated per the actions of the members of that group-based communication interface and is separate and distinct from other group-based communication interfaces (e.g., interfaces of Beta Corp. or Charlie Corp.).

Each of the plurality of group-based communication channels in the selected group-based communication interface includes one or more group-based message. The selected group-based communication interface may be used as part of a standalone service, application, or device or it may be applied as a layer atop an existing service application or device.

The selected group-based communication interface is configured to allow members of the interface to communicate within group-based communication channels and across group-based communication channels to provide relevant information, including an application dialog received from an external application rendered on a client device, to other members efficiently and effectively. User interaction data may be generated based on group-messages in the group-based communication channels. A validation server will parse the user interaction data received and identify a triggering event associated with an external application by comparing the parsed user interaction data with a triggering event registry. The validation server will then send a trigger token to the external application associated with the triggering event. In response to receiving the trigger token, the external application will send the validation servers application dialogs and/or dialog validation data. If the validation server determines that the dialog validation data received satisfies external application validation parameters, the validation server will output all or part of the validated application dialog for rendering the application dialog on a client device by a group-based communication interface.

As will be discussed in greater detail below, the selected group-based communication interface is configured to display a wide variety of group-based messages for any purpose that might be of interest to a user (e.g., direct group-based messages). The selected group-based communication interface may be used to visualize any set of group-based communication channels and group-based messages, including application dialog received from an external application, for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messages.

Exemplary Architecture

FIG. 1 shows system 100 including an example network architecture comprising one or more devices and sub-systems that are configured to implement some embodiments discussed herein. For example, system 100 may include TI-ADV system 102, which can include, for example, validation server 102A, group-based message server 102B, user account database 102C, analytical engine and database 102D, among other things (not shown). Each one of the servers and databases in TI-ADV system 102 may include any suitable network server and/or other type of processing device. In some embodiments, the validation server 102A may determine and transmit commands and instructions for validating and transmitting application dialogs to client devices 106A-106N.

TI-ADV system 102 is configured to communicate with one or more client devices 106A-106N via network 104. In this regard, network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel.

Client devices 106A-106N and/or TI-ADV system 102 may each be implemented as a personal computer and/or other networked device, such as a cellular phone, tablet computer, mobile device, terminal, or server, which may be used for any suitable purpose in addition to presenting the group-based communication interface. The depiction in FIG. 1 of "N" members is merely for illustration purposes. Any number of members may be included in the system 100 so long as the members have the proper credentials for accessing a selected group-based communication interface. In one embodiment, the client devices 106A-106N may be configured to display a graphic user interface on a display of the client device for viewing, creating, editing, and/or otherwise interacting with at least one group-based communication channel of the group-based communication interface, which may be hosted, maintained, and supported by the TI-ADV system 102.

In some embodiments, user interaction data (perhaps generated based on a group-based message) may be sent from a client device 106A-106N to TI-ADV system 102. In various implementations, the user interaction data is sent to the TI-ADV system 102 over network 104 directly by a client device 106A-106N and, in alternate embodiment, the user interaction data may be sent to the TI-ADV system 102 through some intermediary device or component (not shown).

In one example, a group-based message transmission compromising a group-based message may be sent from client device 106A-106N to TI-ADV system 102. In various implementations, the group-based message transmission is sent to the TI-ADV system 102 over network 104 directly by a client device 106A-106N, the group-based message is sent to the TI-ADV system 102 via an intermediary such as another TI-ADV system, and/or the like. User interaction data generated based on the group-based message may also be sent from client device 106A-106N to TI-ADV system 102 along with the group-based message. Alternatively, TI-ADV system 102 can also generate user interaction data based on the group-based message received. The user interaction data and/or group-based message transmission is then determined and provided by group-based message server 102B to the validation server 102A and received by communication module 212 at validation server 102A. In another example, the group-based message received from a client device is directly received by input/output module 210 at validation server 102A. In one implementation, the user interaction data received by validation server 102A includes data generated based on group-based message and group-based message information data such as a group-based message identifier, sending user identifier, a group identifier, a group-based communication channel identifier, group-based message contents (e.g., text, emojis, images, links), attachments (e.g., files), group-based message hierarchy data (e.g., the group-based message may be a reply to another group-based message), third party metadata, and/or the like; after parsing the user interaction data via interaction parsing module 216, validation server 102A may identify a triggering event. In one embodiment, the client device 106A-106N may provide the following example group-based message, substantially in the form of a (Secure) Hypertext Transfer Protocol ("HTTP(S)") POST group-based message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further group-based messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name> </app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
```

```
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <group-based message>
        <group-based message_identifier>ID_group-based message_10</group-based
message_identifier>
        <team_identifier>ID_team_1</team_identifier>
        <channel_identifier>ID_channel_1</channel_identifier>
        <contents> /ACME_docs_all </contents>
        <attachments></attachments>
    </group-based message>
</auth_request>
```

The TI-ADV system 102 then, using group-based message server 102B, may create a stored group-based message based upon the received group-based message to facilitate group-based message indexing and storage in a group-based communication repository. In one implementation, the stored group-based message transmission may include data such as a group-based message identifier, a group identifier, a group-based communication channel identifier, a sending user identifier, topics, responses, group-based message contents, attachments, group-based message hierarchy data, third party metadata, conversation primitive data, and/or the like. For example, the TI-ADV system 102, group-based message server 102B, may provide the following example group-based message stored on the database, substantially in the form of a HTTP(S) POST group-based message including XML-formatted data, as provided below:

```
POST /storage_group-based message.php HTTP/1.1
Host: www.server.com
Content-Type: Application/XML
Content-Length: 667
<?XML version = "1.0" encoding = "UTF-8"?>
<storage_group-based message>
    <group-based message_identifier>ID_group-based
    message_10</group-based message_identifier>
    <team_identifier>ID_team_1</team_identifier>
    <channel_identifier>ID_channel_ 1</channel_identifier>
    <sending_user_identifier>ID_user_1</sending_user_identifier>
    <topics>
        <topic>disclosures</topic>
        <topic>technical</topic>
        <topic>documents</topic>
    </topics>
    <responses>
        <response>liked by ID_user_2</response>
        <response>starred by ID_user_3</response>
    </responses>
    <contents> Here's the link to the shared document:
    https://doc.ACME.com/12345.</contents>
    <attachments></attachments>
    <conversation_primitive>
        conversation includes group-based messages: ID_group-based
message_8, ID_group-based message_9, ID_group-based message_10,
        ID_group-based message_11, ID_group-based message_12
    </conversation_primitive>
</storage_group-based message>
```

In embodiments, a group identifier as defined above may be associated with the group-based message.

In embodiments, a group-based communication channel identifier as defined above may be associated with the group-based message.

In embodiments, a sending user identifier as defined above may be associated with the group-based message. In one implementation, the group-based message may be parsed (e.g., using PHP commands) to determine a sending user identifier of the user (i.e., user profile) who sent the group-based message.

In embodiments, topics may be associated with the group-based message or other user interactions. In one implementation, the group-based message contents may be parsed (e.g., using PHP commands) to determine topics discussed in the group-based message. For example, hashtags in the group-based message may indicate topics associated with the group-based message. In another example, the group-based message may be analyzed (e.g., by itself, with other group-based messages in a conversation primitive) or parsed using a machine learning technique, such as topic modeling, to determine topics associated with the group-based message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based message database). In one implementation, a storage message may be sent from group-based message server 102B to facilitate indexing in the group-based message database. In another implementation, metadata associated with the message may be determined and the message may be indexed in the group-based message database. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the group-based message database to facilitate searching. In one embodiment, the files may be indexed such that a company's or a group's files are indexed at a separate distributed database.

Figure 2:
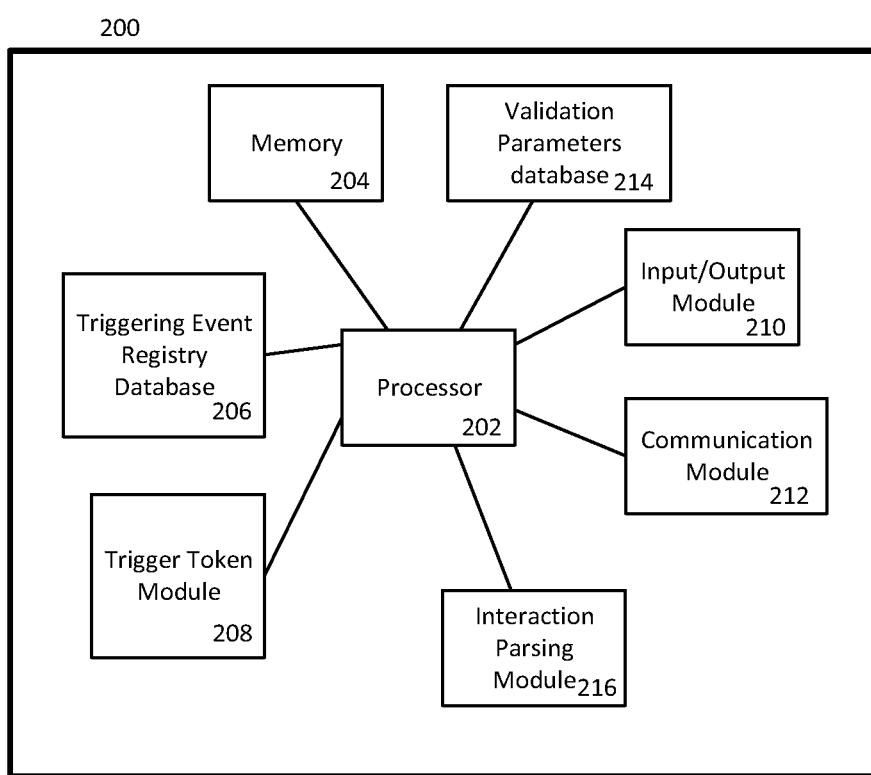
FIG. 2 illustrates a schematic block diagram of circuitry that can be included in a computing device such as a validation server of a TI-ADV system structured in accordance with some embodiments discussed herein.

FIG. 2 shows a schematic block diagram of TI-ADV circuitry 200, which may be included in, for example, validation server 102A or other servers of FIG. 1. Any of the aforementioned systems or devices may be configured to perform, either independently or jointly with other devices connected within network 104. As illustrated in FIG. 2, in accordance with some example embodiments, TI-ADV circuitry 202 includes various means, such as processor 202, memory 204, triggering event registry database 206, trigger token module 208, communication module 212, interaction parsing module 216, triggering event registry module 218 and/or input/output module 210. As referred to herein, "module" includes hardware, software and/or firmware configured to perform one or more particular functions. In this regard, the TI-ADV circuitry 200 of validation server 102A as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof. In some embodiments, the group-based message server 102B, using validation server 102A, may provide the following example stored group-based message, substantially in the form of a HTTP(S) POST group-based message including XML-formatted data, as provided below:

```
POST /storage_group-based message.php HTTP/1.1
Host: www.server.com
Content-Type: Application/XML
Content-Length: 667
<?XML version = "1.0" encoding = "UTF-8"?>
<storage_group-based message>
    <group-based message_identifier>ID_group-based
    message_10</group-based message_identifier>
    <team_identifier>ID_team_1</team_identifier>
    <channel_identifier>ID_channel_ 1</channel_identifier>
    <sending_user_identifier>ID_user_ 1</sending_user_identifier>
    <topics>
        <topic>disclosures</topic>
        <topic>technical</topic>
        <topic>documents</topic>
    </topics>
    <responses>
        <response>liked by ID_user_2</response>
        <response>starred by ID_user_3</response>
    </responses>
    <contents> Here is page 1 of Acme Doc 12345:</contents>
    <attachments></attachments>
    <conversation_primitive>
        conversation includes group-based messages: ID_group-based
    message_8, ID_group-based message_9, ID_group-based message_10,
        ID_group-based message_11, ID_group-based message_12
    </conversation_primitive>
</storage_group-based message>
```

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 202 comprises a plurality of processors. The plurality of processors may be embodied on a single computing device or may be distributed across a plurality of computing devices collectively configured to function as circuitry of validation server 102A.

The plurality of processors may be in operative communication with each other and may be collectively configured to perform one or more functionalities of circuitry of validation server 102A as described herein. In an example embodiment, processor 202 is configured to execute instructions stored in memory 204 or otherwise accessible to processor 202.

Whether configured by hardware, firmware/software methods, or by a combination thereof, processor 202 may comprise an entity capable of performing operations according to embodiments of the present disclosure while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations of the validation server or other components of the TI-ADV system described herein, such as those discussed in connection with FIGS. 3-8.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data (including item data and/or profile data), applications, instructions, or the like for enabling circuitry of validation server 102A to carry out various functions in accordance with example embodiments of the present disclosure. For example, in at least some embodiments, memory 204 is configured to buffer input data for processing by processor 202. Additionally or alternatively, in at least some embodiments, memory 204 is configured to store program instructions for execution by processor 202. Memory 204 may store information in the form of static and/or dynamic information. This stored information may be stored and/or used by circuitry of validation server 102A during the course of performing its functionalities.

In some embodiments, triggering event registry database 206 may also or instead be included and configured to store a collection of triggering events and associated triggering event requests that are accessible by validation server 102A to identify triggering events, route triggering token communications, for example, to external application 108A-108N, and to validate external application communications including application dialogs received from external applications 108A-108N. In some embodiments, the triggering event registry may be updated manually with pre-defined triggering events and associated information. In another embodiment, the triggering event registry 206 may be updated programmatically using machine learning techniques, such as by using a trigger identification computational learning model that is trained using historical user interaction data associated with one or more group-based communication interfaces. One example triggering event registry comprises user interaction data, external application information such as external application ID, external application address, application dialog requests associated with the user interaction data, user profile data associated with the user interaction data, other indicators generated based on the aforementioned data, and the like.

Analytical engine and database 102D may be configured to update triggering event registry 206 using machine learning techniques. In some examples, a historical triggering event identification service is built or otherwise instantiated using a computational learning model that is trained using historical triggering event identification data. In particular, the computational learning model (e.g., a triggering event identification model) is configured to identify one or more extracted features that are suggestive of a triggering event, such as a label associated with an external application. Given a trained computation learning model, the system is configured to ingest or otherwise access historical triggering event identification data related to a current triggering event identification. Given said historical triggering event identification data, the example systems and methods are configured to output a label, a characterization, or the like.

Trigger token module 208 may be configured to generate a trigger token to validate or authenticate an external application dialog received from external application 108A-108N. The trigger token may be a pseudorandom generated number, key, or other unique identifier. In some embodiments, trigger token module 208 may generate data that indicates that a particular triggering event was received from input/output module 210. Some or all of the functionality of generating a trigger token may be performed by processor 202. In some embodiments, the unique identifier may comprise an application dialog request.

Input/output module 210 may be in communication with processor 202 to receive an indication of a user interaction and/or to provide an audible, visual, mechanical, or other output to a user. As such, input/output module 210 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry of validation server 102A is embodied as a server or database, aspects of input/output module 210 may be reduced as compared to embodiments where circuitry of validation server 102A is implemented as an end-user machine (e.g., client device) or other type of device designed for other complex user interactions.

Communication module 212 may be embodied as any device or means embodied in circuitry, hardware, a computer program product comprising computer readable program instructions stored on a computer readable medium (e.g., memory 204 or a non-transitory computer readable medium) and executed by a processing device (e.g., processor 202), or a combination thereof that is configured to receive and/or transmit data from/to another device and/or network such as other servers. In some embodiments, communication module 212 (like other components discussed herein) can be at least partially embodied as or otherwise controlled by processor 202. In this regard, communication module 212 may be in communication with processor 202, such as via a bus. Communication module 212 may include, for example, an antenna, a transmitter, a receiver, a transceiver, network interface card and/or supporting hardware and/or firmware/software for enabling communications with another computing device. Communication module 212 may be configured to receive and/or transmit any data that may be stored by memory 204 using any protocol that may be used for communications between computing devices. Communication module 212 may additionally or alternatively be in communication with the memory 204, input/output module 210 and/or any other component of circuitry of server 102, such as via a bus.

In some embodiments (like other components discussed herein), input/output module 210 may even be eliminated from circuitry of validation server 102A. Alternatively, such as in embodiments wherein circuitry of validation server 102A is embodied as a server or database, at least some aspects of input/output module 210 may be embodied on an apparatus (e.g., a client device) used by a user that is in communication with circuitry of validation server 102A. Input/output module 210 may be in communication with the memory 204, communication module 212, and/or any other component(s), such as via a bus. One or more than one input/output module and/or other component can be included in circuitry of validation server 102A.

In some embodiments, validation parameter database 214 may be configured to store a set of routines, characteristics, functions, values or algorithms that validation server 102A may use to determine whether an application dialog received from external application 102A-102N should be validated. In some embodiments, validation parameter database 214 may store a response time threshold (i.e., a time period deemed acceptable between trigger token transmission time stamp and a dialog validation data received time stamp). In some embodiments, validation parameter database 214 may store historical communication history between an external application and a validation server, such as the frequency of application dialogs being sent to client devices 106A-106N and application dialog content indicator. Application dialog content indicator may comprise data that indicates the content of application dialog, such as data indicating whether the content of application dialog is offensive or otherwise inappropriate. In some embodiments, the application dialog content indicator may be generated from analytical engine and database 102D. The validation parameter database may also include other suitable set of routines, characteristics, functions, values and algorithms. In some embodiments, the application dialog content indicator may comprise a subset of the application dialog content.

Interaction parsing module 216 may also or instead be included and configured to parse user interaction data to identify a triggering event. In some embodiments, interaction parsing module 216 may be configured to normalize different types of user interaction data received, such as group-based messages, audible, visual, or mechanical user interactions received from various input/output mechanisms of client devices such as a keyboard, a mouse, a joystick, a display, a touch screen display, a microphone, a speaker, a RFID reader, barcode reader, biometric scanner, and/or other input/output mechanisms. In some embodiments, the interaction parsing module 216 is further configured to parse a group-based message to determine the context and topics associated with the group-based message.

Triggering Event Identification and Application Dialog Validation

Figure 3A:
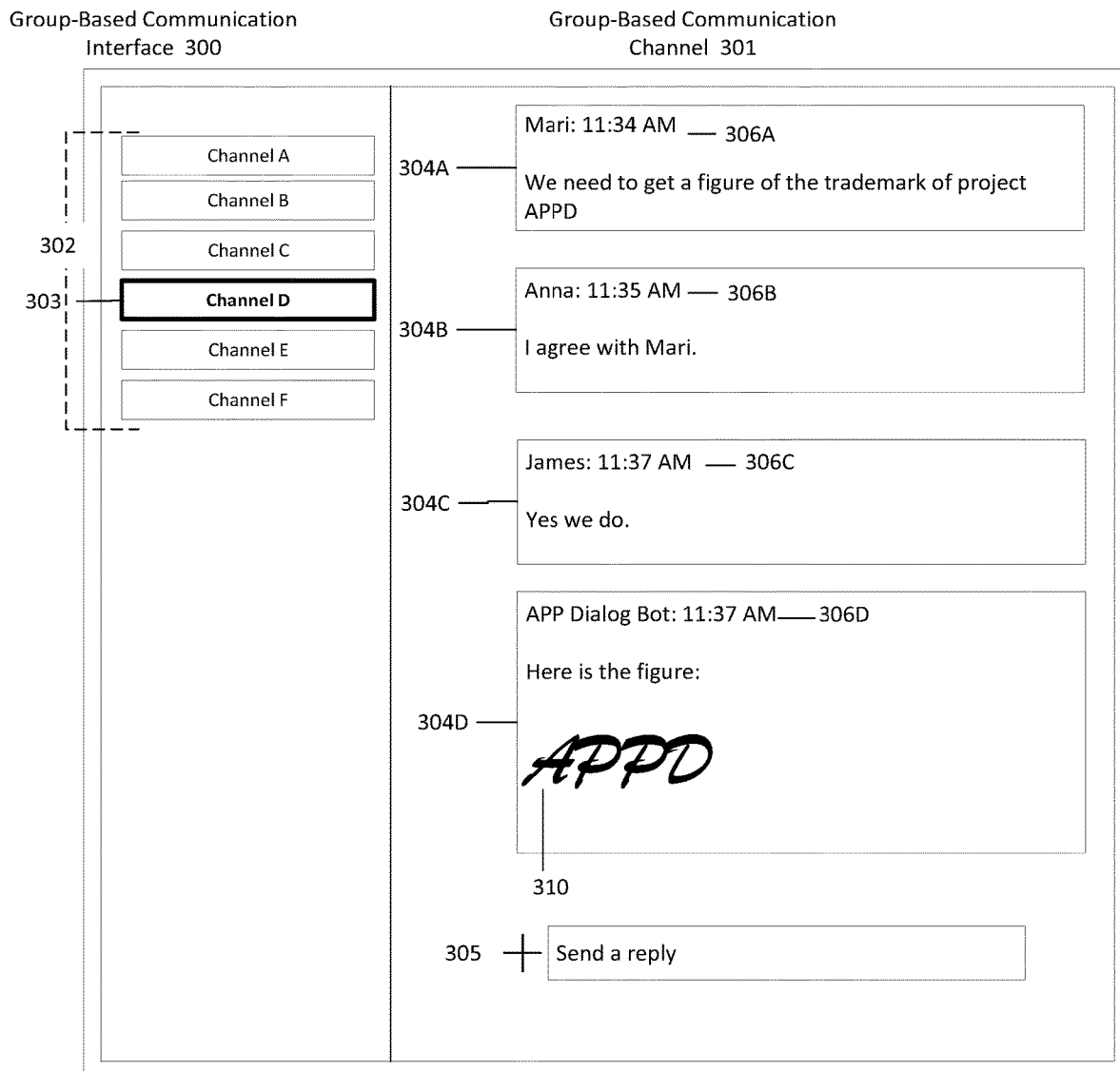
FIGS. 3A-3C illustrate example user interaction associated with a triggering event and application dialogs displayed in a group-based communication interface in accordance with some embodiments discussed herein.

FIG. 3A illustrates an example group-based communication interface 300 structured in accordance with various embodiments of the disclosure. As described herein, group-based communication interface 300 is presented on a display of client device 106A. Group-based messages are presented in a selected group-based communication channel 303 (Channel D) and include group-based messages 304A-C. Each group-based message comprises group-based message information 304A-304C, which, as illustrated, identifies the user who inputted the group-based message and a timestamp of when the group-based message was inputted. In the example embodiment, the group-based messages are uniformly presented to each of the users viewing the group-based messages in the selected channel. For the purposes described herein, the user may input a group-based message utilizing input field 305 and group-based message server 102B. For example, the user (Mari) inputs or enters "We need to get a figure of the trademark of project APPD" into input field 305.

As shown in FIG. 3A, group-based message 304B and 304C includes message regarding group-based message 304A. Interaction parsing module 216 parses the user interaction data generated based on 304A-304C and identified a triggering event by comparing user interaction data generated with data stored on triggering event registry database 206. The triggering event registry database may have stored topic-user association indicator that associates all of Mari, Anna and James's user profile with the topic of "intellectual property". Validation server 102A may receive data indicating that the word "trademark" was parsed from the user interaction data generated based on the user input of "We need to get a figure of the trademark of project APPD" was identified, and other user interaction data such as user interaction data generated based on Anna and James' group-based message, then identify all the user interaction data together as a triggering event.

The interaction parsing module 216 also determined that the triggering event is correlated to application dialog request that indicates that the user requested a figure from a picture management external application. For example, the interaction parsing module determines that the user requested a figure from a picture management external application based on the word "figure" in the user input. In another example, the interaction parsing module may make such a determination based on other keywords in user interaction or user profiles. As a result, a trigger token generated by trigger token module 208 is sent to picture management external application 108A. Along with the trigger token, application dialog request indicating that "a figure of the trademark of project APPD" is requested generated based on the user interaction data is also sent to picture management external application 108A. In some embodiments, the trigger token itself may indicate that "a figure of the trademark of project APPD" is requested. In another example, the application dialog request itself may be used as a trigger token.

Picture management external application 108A then sends back an application dialog comprising the requested figure and/or dialog validation data back to validation server 102A. The validation server 102A validates the application dialog by comparing the validation data with external application validation parameters stored on validation parameters database 214. In one example, the external application dialog validation data comprises time stamp data and the validation parameter comprise a pre-determined time period. By comparing validation parameter pre-determined time period to a difference between the time stamp data and a system time, validation server 102A determines that the application dialog satisfies the external application validation parameters. Validation server 102A then output the application dialog to the client device for display by the group-based communication interface.

Group-based message 304D comprises application dialog received from external application 108A in the form of a figure after the application dialog is validated using validation parameters database 214. The application dialog comprises FIG. 310 which is a figure of the trademark of project APPD.

Figure 3B:
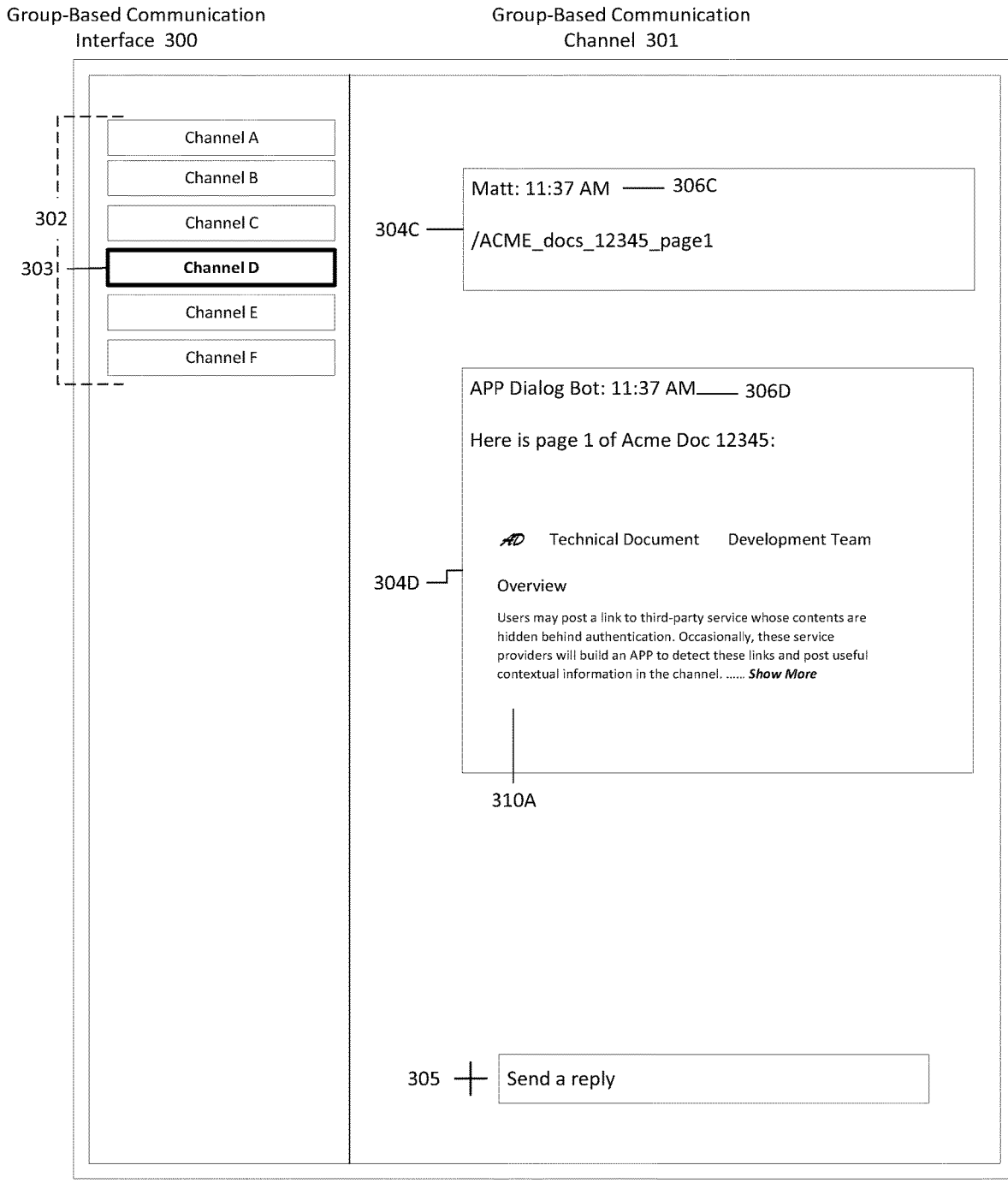

Alternatively, identifying a triggering event may only need user interaction data associated with one user. As shown in FIG. 3B, a triggering event is identified in user interaction data generated based on group-based message 304A "/ACME_docs_12345_page1". After generating application request, trigger token, sending trigger token and validation, group-based message 304B that comprises application dialogs that includes "page 1 of Acme Doc 12345" is displayed on group-based communication interface 300.

Figure 3C:
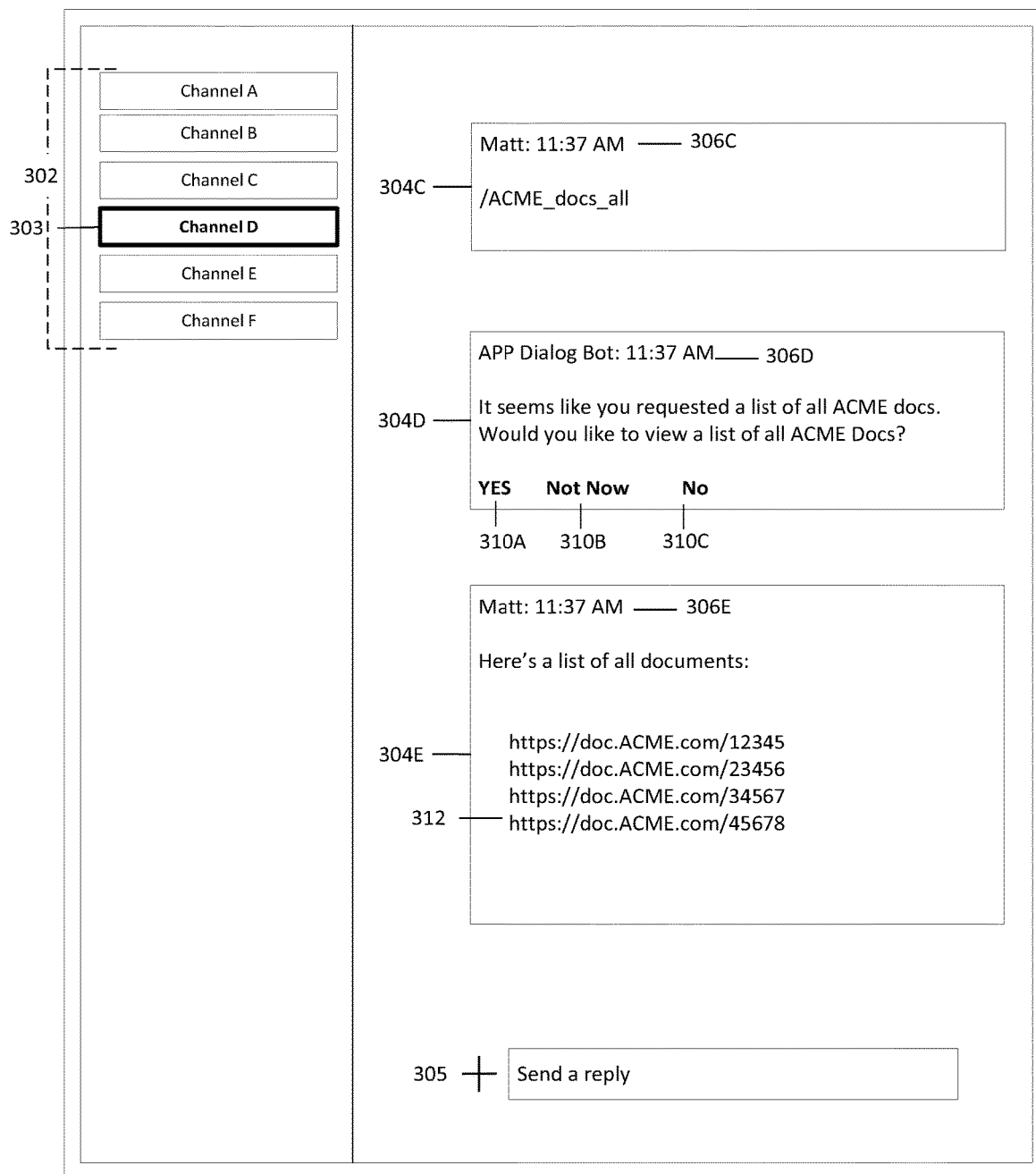

In some examples, the servers of TI-ADV system 102 may provide an opportunity to let the user confirm that the user intends to request application dialogs. As shown in FIG. 3C, a probable triggering event is identified in user interaction data generated based on group-based message 304A "/ACME_docs_all". After user interaction data generated based on 304A and 310A (The yes button confirmation) is received, the validation server then determines that a triggering event is identified. After generating application request, trigger token, sending trigger token and validation, group-based message 304D that comprises application dialogs that includes "a list of all ACME documents" is displayed on group-based communication interface 300.

In some embodiments, analytical engine and database 102D may be configured to store any data generated in the process shown in FIGS. 3A-3C for future triggering event registry updating purposes.

Figure 4:
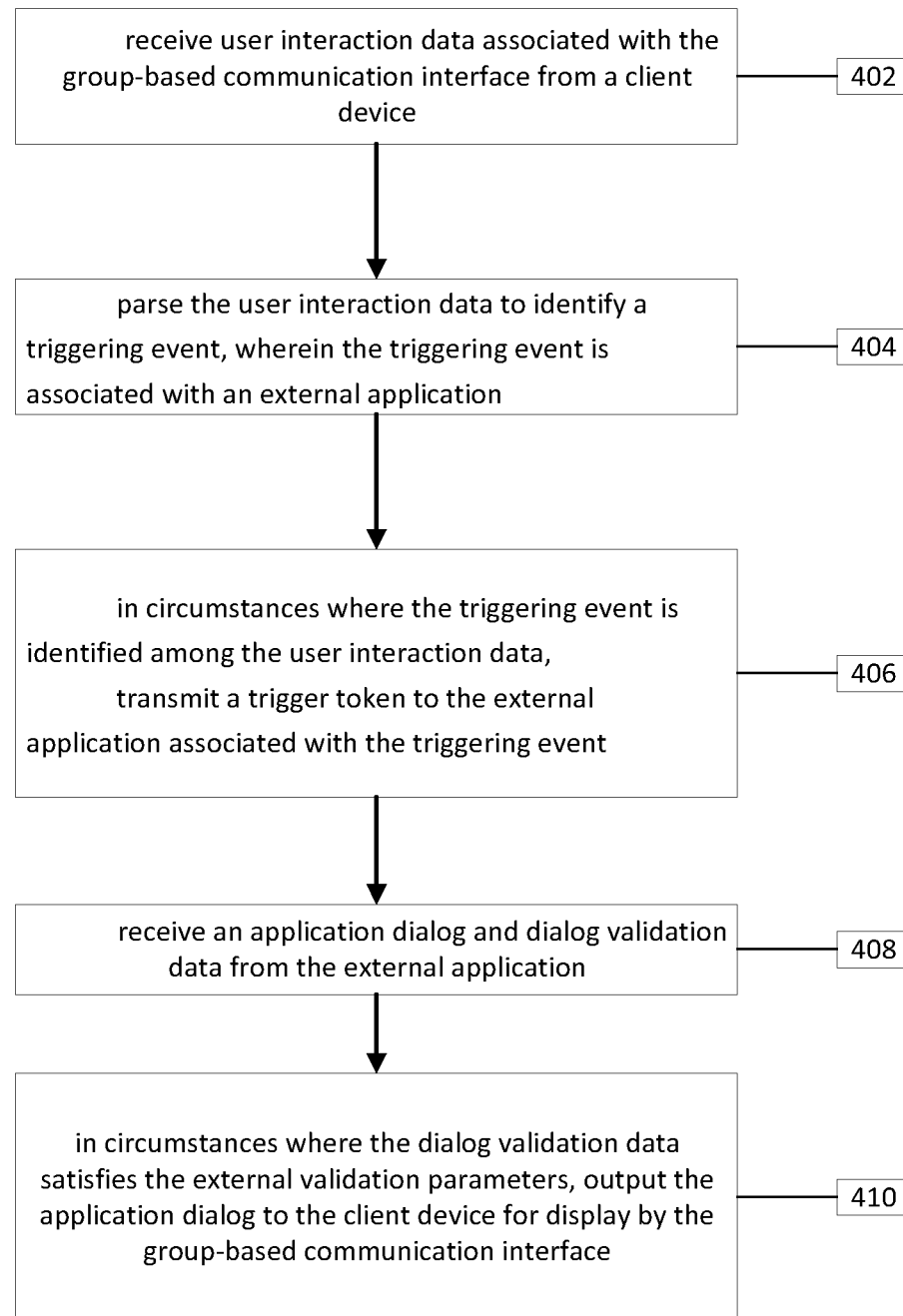
FIG. 4 illustrates flow diagram for validating and outputting an application dialog in accordance with some embodiments discussed herein.

FIG. 4 illustrates a flow diagram of an example system in accordance with some embodiments discussed herein. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

In particular, FIG. 4 illustrates a method for validating an application dialog received from an external application following a triggering event identified in association with a group-based communication interface and outputting the application dialog to the client device for rendering and display by the group-based communication interface, such as shown in FIGS. 3A-C. At 402, the example system receive user interaction data associated with the group-based communication interface from a client device. At 404, the example system parse the user interaction data to identify a triggering event, wherein the triggering event is associated with an external application. At 406, in circumstances where the triggering event is identified among the user interaction data, the example system transmit a trigger token to the external application associated with the triggering event.

At 408, the example system receive an application dialog and dialog validation data from the external application. The dialog validation data may comprise time stamp data, trigger token, the application dialog itself or application dialog content indicators, and the like.

At 410, in circumstances where the dialog validation data satisfies the external validation parameters, the example system output the application dialog to the client device for display by the group-based communication interface. The validation parameters may comprise a pre-determined time period to a difference between the time stamp data and a system time.

In another example, the validation parameters may comprise, a historical communication indicator between an external application and a validation server, wherein the historical communication indicator comprises frequency of application dialogs being sent and historical application dialog content indicator. The historical application dialog content indicator may contain data indicating the topics, context, appropriateness, etc., of the application dialog sent in the past. In some embodiments, the historical application dialog content indicator may be obtained by receiving an application dialog; parsing an application dialog to determine whether the application dialog contains inappropriate content or validating topics; updating the historical application dialog content indicator based on whether the application dialog contains inappropriate content or validating topics. The validating topics could be any pre-defined topic that could be used in validating an application dialog. For example, in a group-based channel on intellectual property, indicators that suggests certain application dialogs are associated with topics such as "patents" and "trademarks" could be used to validate an application dialog.

Figure 5:
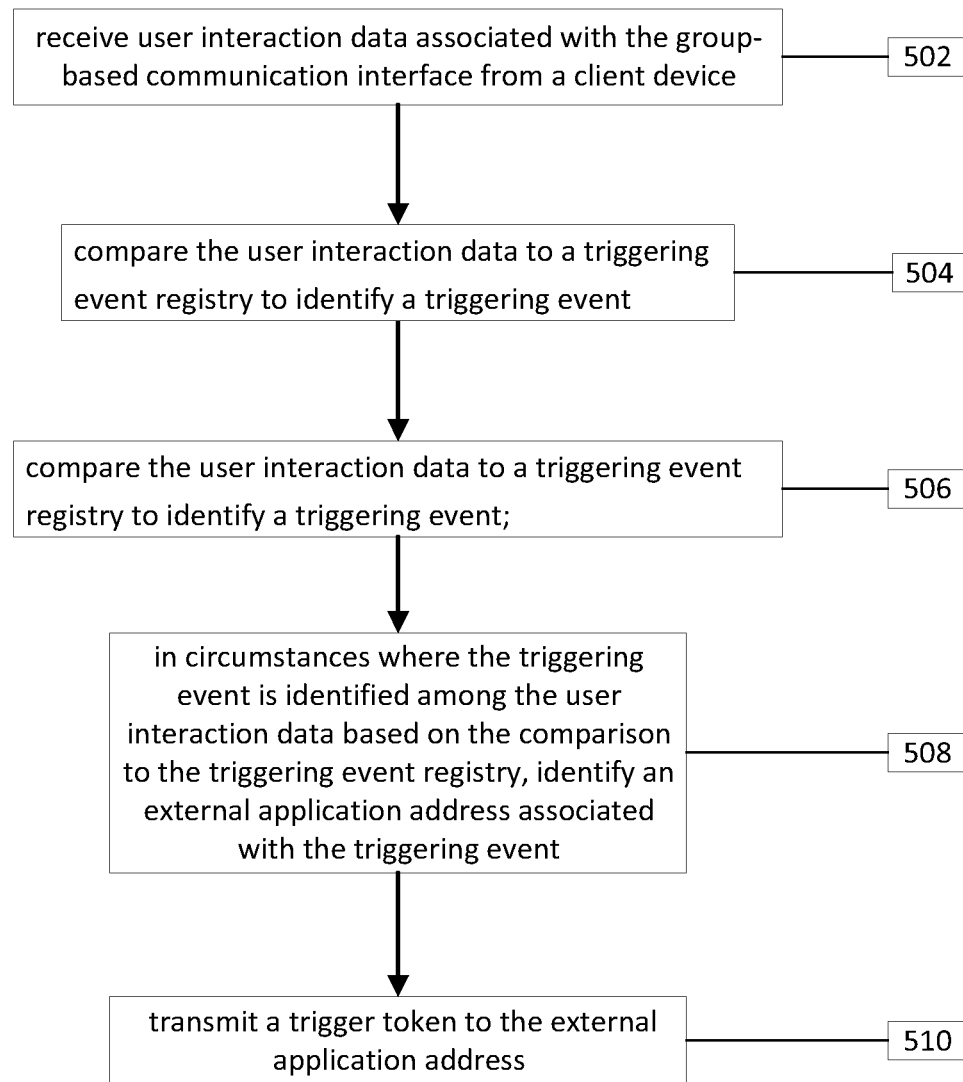
FIG. 5 illustrates an flow diagram for identifying a triggering event in accordance with some embodiments discussed herein.

FIG. 5 illustrates a flow diagram of an example system in accordance with some embodiments discussed herein. In particular, FIG. 5 illustrates a method for identifying a triggering event associated with a group-based communication interface, such as shown in FIG. 3. At 502, the example system receive user interaction data associated with the group-based communication interface from a client device. The user interaction data could be user interaction data originated from multiple users and multiple client devices. At 504, the example system compare the user interaction data to a triggering event registry to identify a triggering event.

At 506, the example system compare the user interaction data to a triggering event registry to identify a triggering event. At 508, in circumstances where the triggering event is identified among the user interaction data based on the comparison to the triggering event registry, the example system identify an external application address associated with the triggering event. At 510, the example system transmit a trigger token to the external application address. After 510, the triggering event registry may be updated based on machine learning techniques.

Figure 6:
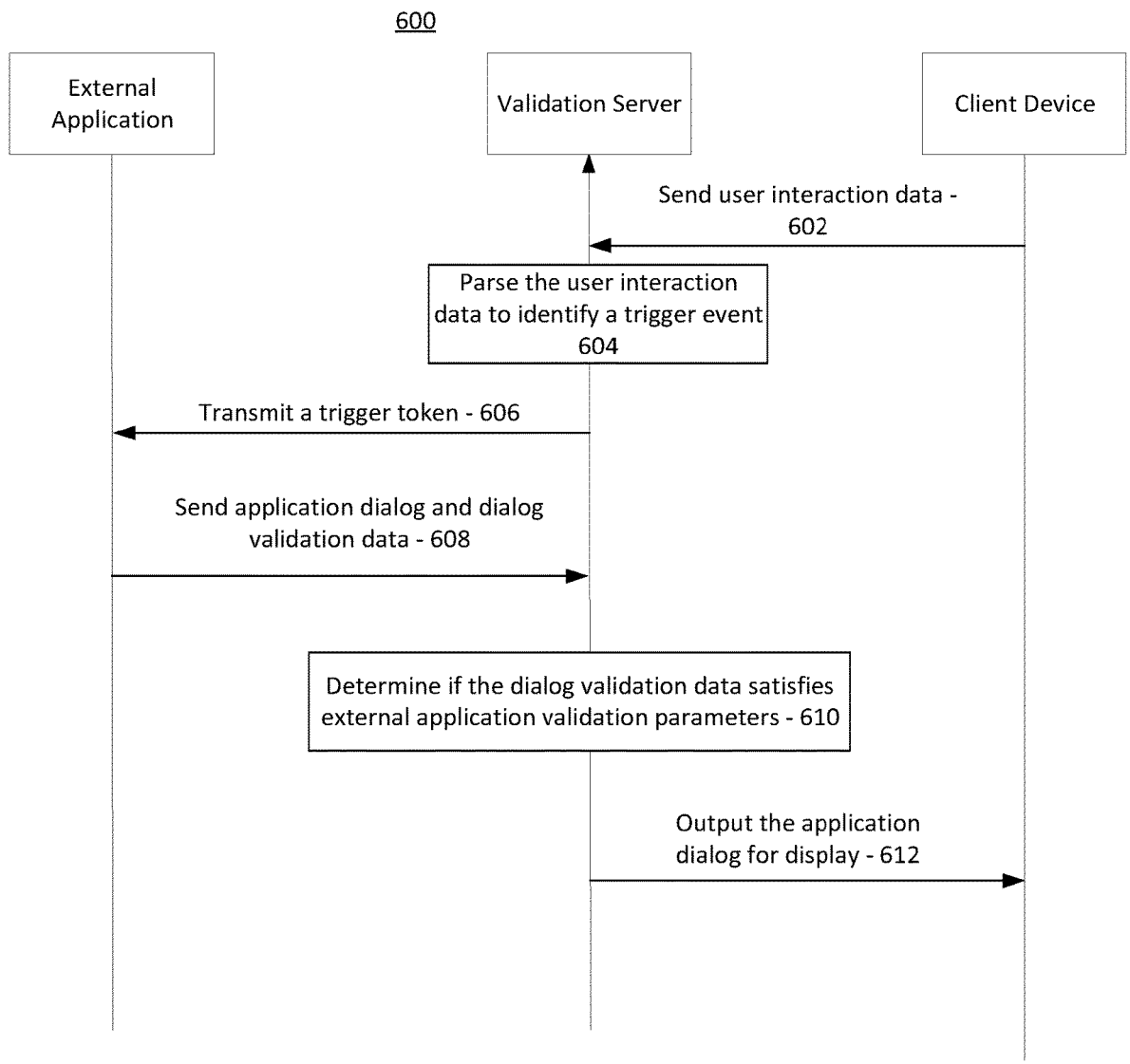
FIG. 6 illustrates example triggering event identification and application dialog validation processes executed by an external server, a validation server, and a client device in accordance with one embodiment discussed herein.

FIG. 6 shows a flow chart of an example of a method 600 of validating an application dialog received from an external application following a triggering event identified in association with a group-based communication interface and outputting the application dialog to the client device for display by the group-based communication interface, performed in accordance with some embodiments.

At 602, the client device (e.g., client device 106A shown in FIG. 1) may be configured to send user interaction data to a validation server (e.g., validation server 102A shown in FIG. 1). At 604, the validation server may be configured to parse the user interaction data to identify a triggering event, using, for example, interaction parsing module 216. At 606, the validation server may transmit a trigger token to external application (e.g., external application 108A shown in FIG. 1). A separate application dialog request may be sent along with the trigger token. At 608, the external application may send application dialog and dialog validation data to validation server. The dialog validation data may be the application dialog itself. At 610, the validation server may be configured to determine if the dialog validation data satisfies external application validation parameters. At 612, the validation server may output the application dialog to client device for display.

Machine Learning Based Triggering Event Registry Updating

Figure 7:
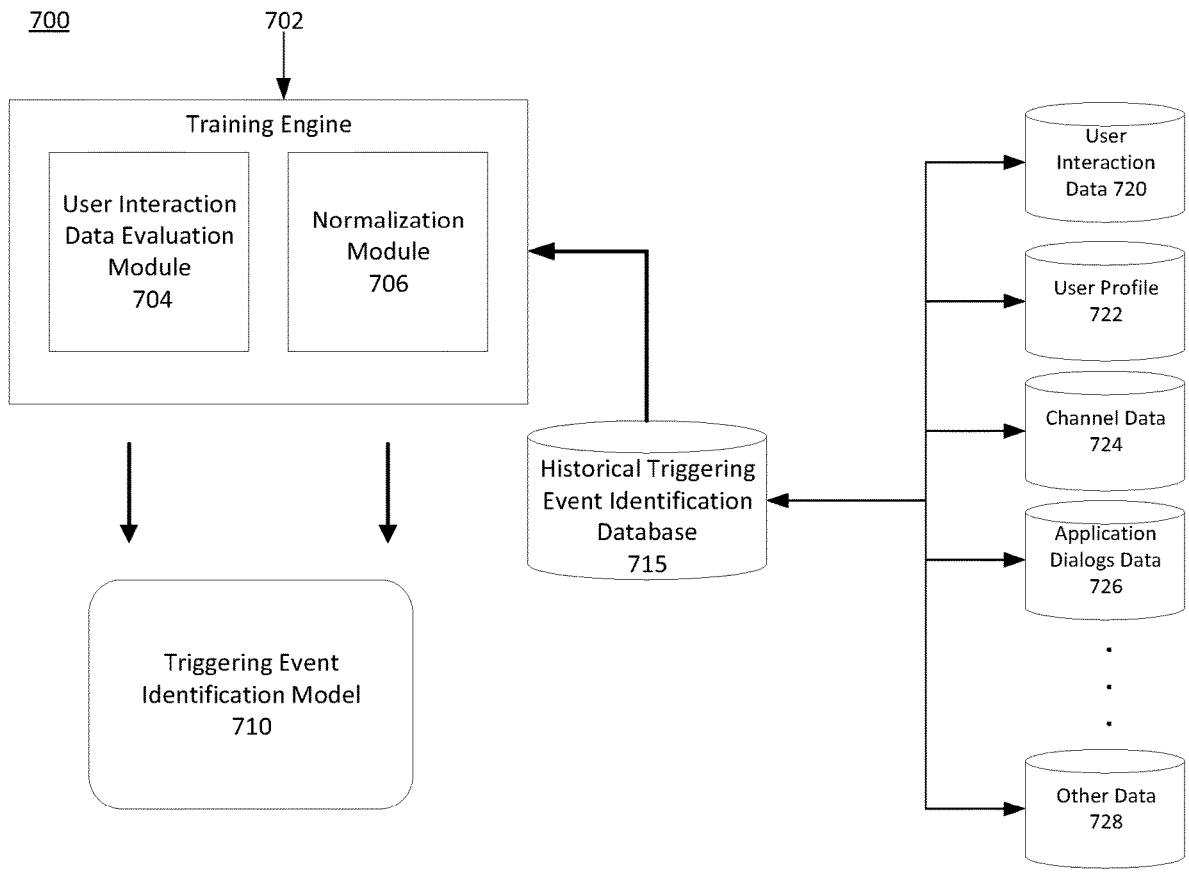
FIG. 7 is an example block diagram of example components of an example triggering event identification model training environment.

FIG. 7 is an example block diagram of example components of an example triggering event identification model training environment 700 that is used to train the triggering event identification model that is relied upon by the validation server 102A to update triggering event registry in some example embodiments. The depicted triggering event identification training environment 700 comprises a training engine 702, triggering event identification model 710, and a historical triggering event identification database 715. The training engine 702 and the triggering event identification model 710 may take the form of, for example, a code module, a component, circuitry and/or the like. Some or all of the functionality of the training engine 702 may be performed by analytical engine and database 102D. The components of the triggering event identification model training environment 700 are configured to provide various logic (e.g. code, instructions, functions, routines and/or the like) and/or services related to the triggering event identification model training environment 700.

In some examples, the historical triggering event identification database 715 comprises a variety of input data representative of historical triggering event identification. In some examples, the historical data may be obtained and/or stored after validation server 102A receives user interaction data. In yet other cases, the historical triggering event identification data may be obtained and/or otherwise stored after application dialogs are validated.

Alternatively or additionally, the historical triggering event identification data may be labeled and/or characterized by a score. For example, user interaction data associated with users who frequently send group-based messages related to patents and trademarks may be assigned a label of "IP". In some examples, these labels may be based on historical application dialog requests. For example, if a user requests pictures from picture management external application frequently, the user may be assigned a label of "pictures". The system may ingest or otherwise access user interaction data associated with the labeled user, user profiles associated with a particular type of user interaction data, group-based channel information, and the like, and use such data as part of the historical triggering event identification data stored in historical triggering event identification database 715.

In some examples, historical triggering event identification database 715 may also comprises a variety of additional historical triggering event identification data representative of historical triggering event identification operations. For example, the historical triggering event identification database 715 may comprise historical user interaction data 720, user profile 722, channel data 724, application dialogs data 726, and/or other data 728.

In some examples, historical user interaction data 720 comprises group-based messages, metadata associated with the same, files, clickstream data, client device settings and configuration data, client device contextual data, historical user interaction information and the like. In some embodiments, historical user interaction information are generated based on other historical user interaction data such as data indicating affinity of an user to a channel, other users and teams, data indicating the specific way a user interacts with a client device, data indicating the frequency of user interaction, and the like.

In some example, channel data 724 comprises data associated with a group-based communication channel, such as group-based communication channel identifier, group identifier, name of the group-based communication channel, topics of the group-based messages in the group-based communication channel, frequency of usage, frequent users, and other data generated based on the aforementioned data.

In some example, application dialogs data 726 comprises historical application dialogs, historical dialog validation data, external application information such as external application ID, external application address, application dialog requests indicators, labels and the like.

In some examples, other data 728 comprises data generated based on the aforementioned data, such as sending user identifier, user profile-content indicator, topic-channel association indicator, external application ID-topic association indicator, additional indicators, labels, and the like.

In some examples, the training engine 702 is configured to access or otherwise ingest historical triggering event identification data from historical triggering event identification database 715 to train the triggering event identification model 710 via supervised or unsupervised computational learning.

In some examples, the training engine 702 comprises a normalization module 704. The normalization module 704, in some examples, may be configured to normalize the historical data so as to enable different data sets to be compared. In some examples, the normalization module 704 is configured to parse the user interaction data into identification data units, and then normalize each distinct identification data units using different metrics. That is, in some examples, each user interaction data may be broken down into identification data units based on the type of user interaction associated with the user interaction data, length of a group-based message associated with the interaction, topic of the group-based message associated with the user interaction data, characteristics of user profiles associated with the user interaction data.

Alternatively or additionally, the normalization module 706 may be usable with respect to processing historical triggering event identification data in the historical triggering event identification database 715, such as to normalize the historical triggering event identification data before the historical triggering event identification data is labeled or otherwise characterized.

Alternatively or additionally, triggering event identification model 710 may be trained to extract one or more features from the historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from historical triggering event identification data.

Figure 8:
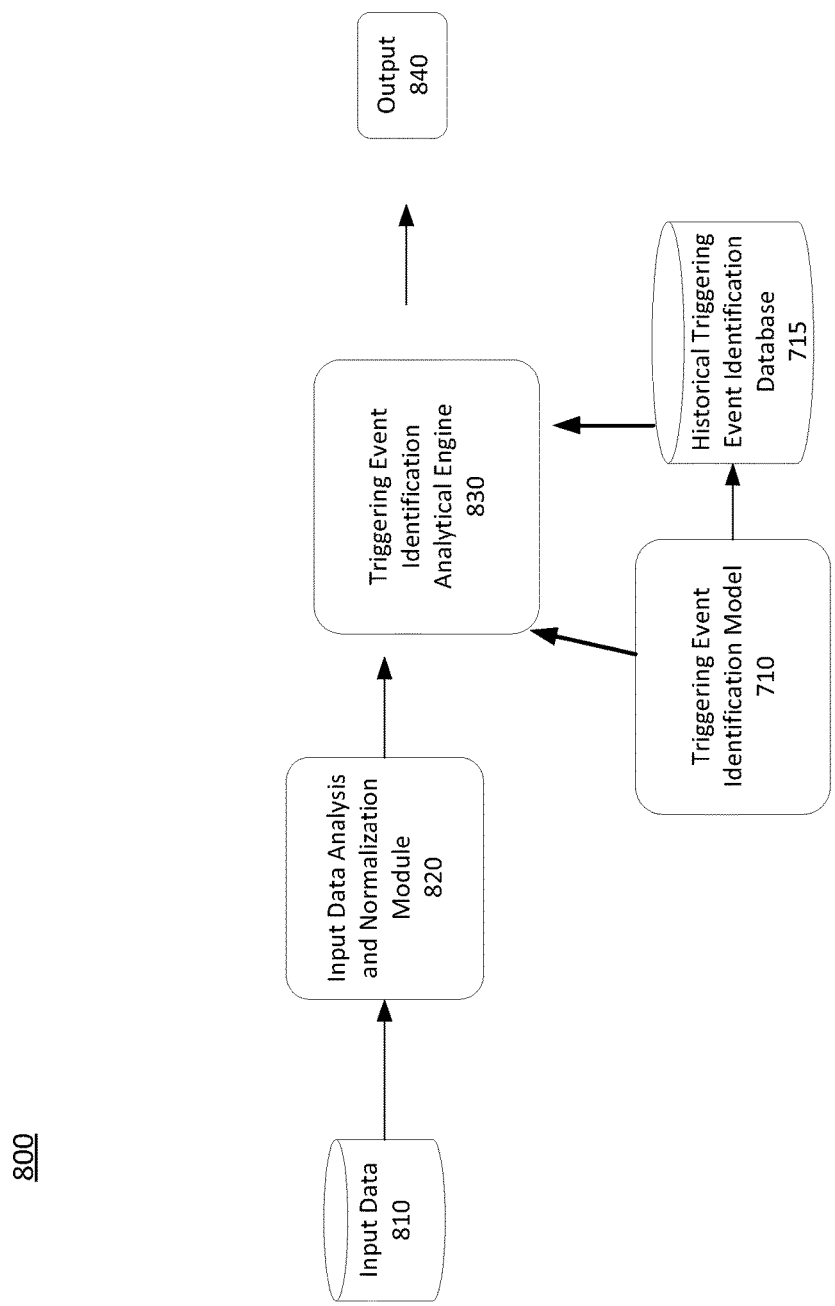
FIG. 8 is an example block diagram of example components of an example triggering event identification model service environment.

FIG. 8 is an example block diagram of example components of an example triggering event identification model service environment 800. In some example embodiments, the example triggering event identification model service environment comprises input data 810, an input data analysis and normalization module 820, a triggering event identification analytical engine 830, output 840, the historical triggering event identification database 715 and/or the triggering event identification model 710. The input data analysis and normalization module 820, a triggering event identification analytical engine 830, and output 840 may take the form of, for example, a code module, a component, circuitry and/or the like. The components of the triggering event identification model service environment 800 are configured to provide various logic (e.g. code, instructions, functions, routines and/or the like) and/or services related to the triggering event identification model service environment.

In some examples, the input data 810 comprises historical user interaction data, user profile, channel data, application dialogs data, and/or other data. In some examples, the input data analysis and normalization module 820 is configured to access or otherwise ingest the input data, such as input data 810. Input data analysis and normalization module 820 may also be configured to normalize the raw input data to generate one or more identification data units and/or otherwise parse the input into the one or more identification data units. In some examples, the input data analysis and normalization module 820 may be configured to normalize the raw input data, such that the data can be analyzed by the triggering event identification analytical engine 830. In some examples the input data analysis and normalization module 820 is configured to parse the input data interaction to generate one or more identification data units. Alternatively or additionally, the input data analysis and normalization module may be configured to extract one or more features from the one or more identification data units. In some examples, the features are representative of at least one of user interaction data, user profile associated with the user interaction, topics associated with the user interaction data, and frequency of user interaction.

In some examples, input data analysis and normalization module 820 and triggering event identification analytical engine 830 are configured to receive a triggering event identification model, wherein the triggering event identification model was derived using a historical triggering event identification data set. Alternatively or additionally, the triggering event identification analytical engine 830 may be configured to generate generating an output 840 based on the triggering event identification model and the one or more features. Output 840 may be configured to update the triggering event registry.

The invention claimed is:

1. A computer-implemented method comprising:
    receiving, from a client device associated with a group-based communication system, user interaction data associated with the group-based communication system;
    inputting the user interaction data to a machine learning model, wherein the machine learning model is generated based at least in part on historical triggering event identification data, wherein the machine learning model is trained on first data that includes a labeled user representing a user profile associated with an application dialog data and on second data that includes the user profile associated with a type of the user interaction data, wherein the machine learning model includes a normalization function to parse the user interaction data into data units;
    receiving, from the machine learning model, a triggering event associated with an application external to the group-based communication system;
    sending an application dialog request, associated with the triggering event, to the application;
    in response to sending the application dialog request to the application, receiving an application dialog from the application, wherein the application dialog includes instructions for rendering, via a group-based communication user interface associated with the group-based communication system, a group-based message including a template associated with the application; and
    based at least in part on a determination that the application is validated for communication with the client device, outputting the application dialog to the client device for display via the group-based communication user interface.

2. The computer-implemented method of claim 1, wherein the user interaction data is associated with at least one of a message, an input, an upload, or another user engagement with the group-based communication user interface.

3. The computer-implemented method of claim 1, wherein the triggering event is stored with the historical triggering event identification data by the group-based communication system for training the machine learning model and updating a trigger event registry.

4. The computer-implemented method of claim 1, further comprising identifying the triggering event from within the user interaction data based at least in part on parsing the user interaction data.

5. The computer-implemented method of claim 1, further comprising comparing the user interaction data to a trigger event registry to identify the triggering event.

6. The computer-implemented method of claim 5, further comprising determining an application address associated with the application and the triggering event, wherein the application dialog request is sent to the application address.

7. The computer-implemented method of claim 1, wherein the application dialog request is associated with at least one of a trigger token, an indication of the application dialog, or an application dialog content indicator.

8. The computer-implemented method of claim 1, wherein the application dialog, when received from the application, is associated with dialog validation data.

9. The computer-implemented method of claim 8, wherein the determination that the application is validated is based at least in part on:
    comparing the dialog validation data to one or more validation parameters; and determining that the dialog validation data satisfies the one or more validation parameters.

10. The computer-implemented method of claim 9, wherein the application dialog request is associated with a first time stamp, the dialog validation data is associated with a second time stamp, and wherein the one or more validation parameters comprise a response time threshold, the computer-implemented method further comprising:
comparing the response time threshold to a time period between the second time stamp and the first time stamp; and
determining that the application is validated based at least in part on the time period between the second time stamp and the first time stamp being within the response time threshold.

11. A system comprising:
one or more processors; and
one or more non-transitory storing computer-readable instructions that, when executed by the one or more processors, cause the system to perform operations comprising:
receiving, from a client device associated with a group-based communication system, user interaction data associated with the group-based communication system;
inputting the user interaction data to a machine learning model, wherein the machine learning model is generated based at least in part on historical triggering event identification data, wherein the machine learning model is trained on first data that includes a labeled user representing a user profile associated with an application dialog data and on second data that includes the user profile associated with a type of the user interaction data;
receiving, from the machine learning model, a triggering event associated with an application external to the group-based communication system;
sending an application dialog request, associated with the triggering event, to the application;
in response to sending the application dialog request to the application, receiving an application dialog and dialog validation data from the application, wherein the application dialog includes instructions for rendering, via a group-based communication user interface associated with the group-based communication system, a group-based message including a template associated with the application; and
based at least in part on a determination, using the dialog validation data, that the application is validated for communication with the client device, outputting the application dialog to the client device for display via the group-based communication user interface.

12. The system of claim 11, wherein the user interaction data is associated with at least one of a message, an input, an upload, or another user engagement with the group-based communication user interface, the operations further comprising identifying the triggering event from within the user interaction data based at least in part on parsing the user interaction data.

13. The system of claim 11, wherein the triggering event is stored with the historical triggering event identification data by the group-based communication system for training the machine learning model and the historical triggering event identification data includes historical user interaction data.

14. The system of claim 11, the operations further comprising:
comparing the user interaction data to a trigger event registry to identify the triggering event; and
determining an application address associated with the application and the triggering event, wherein the application dialog request is sent to the application address.

15. The system of claim 11, wherein the application dialog, when received from the application, is associated with the dialog validation data, and wherein the determination that the application is validated is based at least in part on:
comparing the dialog validation data to one or more validation parameters; and
determining that the dialog validation data satisfies the one or more validation parameters.

16. One or more non-transitory computer-readable media storing instructions that, when executed by one or more processors, cause the one or more processors to perform operations comprising:
receiving, from a client device associated with a group-based communication system, user interaction data associated with the group-based communication system;
inputting the user interaction data to a machine learning model, wherein the machine learning model is generated based at least in part on historical triggering event identification data, wherein the machine learning model is trained on first data that includes a labeled user representing a user profile associated with an application dialog data and on second data that includes the user profile associated with a type of the user interaction data;
receiving, from the machine learning model, a triggering event associated with an application external to the group-based communication system;
sending an application dialog request, associated with the triggering event, to the application;
in response to sending the application dialog request to the application, receiving an application dialog from the application, wherein the application dialog includes instructions for rendering, via a group-based communication user interface associated with the group-based communication system, a group-based message including a template associated with the application; and
based at least in part on a determination that the application is validated for communication with the client device, outputting the application dialog to the client device for display via the group-based communication user interface.

17. The one or more non-transitory computer-readable media of claim 16, wherein the user interaction data is associated with at least one of a message, an input, an upload, or another user engagement with the group-based communication user interface, the operations further comprising identifying the triggering event from within the user interaction data based at least in part on parsing the user interaction data.

18. The one or more non-transitory computer-readable media of claim 16, wherein the triggering event is stored with the historical triggering event identification data by the group-based communication system for training the machine learning model.

19. The one or more non-transitory computer-readable media of claim 16, the operations further comprising:
comparing the user interaction data to a trigger event registry to identify the triggering event; and determining an application address associated with the application and the triggering event, wherein the application dialog request is sent to the application address.

20. The one or more non-transitory computer-readable media of claim 16, wherein the application dialog, when received from the application, is associated with dialog validation data, and wherein the determination that the application is validated is based at least in part on:
  comparing the dialog validation data to one or more validation parameters; and
  determining that the dialog validation data satisfies the one or more validation parameters.

\* \* \* \* \*